United States Patent
Markovs et al.

(10) Patent No.: US 6,287,365 B1
(45) Date of Patent: Sep. 11, 2001

(54) SULFUR PRODUCTION PROCESS

(75) Inventors: John Markovs, Cross Junction, VA (US); Gordon T. Cartwright, Streamwood, IL (US); Carmen M. Yon, Wheaton, IL (US); Henry Rastelli, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/519,832

(22) Filed: Mar. 6, 2000

Related U.S. Application Data

(63) Continuation-in-part of application No. 09/231,359, filed on Jan. 13, 1999, now Pat. No. 6,120,581.

(51) Int. Cl.$^7$ .................................................. B01D 53/04
(52) U.S. Cl. .................................. 95/96; 95/117; 95/143; 95/902
(58) Field of Search ........................... 95/99, 106, 143, 95/144, 96–98, 100–105, 141, 145–148, 902, 117, 121

(56) References Cited

U.S. PATENT DOCUMENTS

| | | | |
|---|---|---|---|
| 4,283,379 | 8/1981 | Fenton et al. | 423/571 |
| 4,359,328 | 11/1982 | Wilson | 55/26 |
| 4,401,556 | 8/1983 | Bezman et al. | 208/111 |
| 4,484,933 | 11/1984 | Cohen | 55/25 |
| 4,528,277 | 7/1985 | Hass et al. | 502/79 |
| 4,576,814 | 3/1986 | Hass et al. | 423/573 G |
| 4,869,803 | 9/1989 | Ward | 208/46 |
| 4,892,723 | 1/1990 | Delaney et al. | 423/573.1 |
| 5,245,099 | 9/1993 | Mitariten | 585/650 |
| 5,354,545 | 10/1994 | Buisman | 423/242.1 |
| 5,417,742 | 5/1995 | Tamhankar et al. | 95/96 |
| 5,536,301 | 7/1996 | Lansbarkis et al. | 95/117 |
| 5,667,560 | 9/1997 | Dunne | 95/113 |
| 5,695,546 | 12/1997 | Izumi et al. | 95/115 |
| 5,702,505 | 12/1997 | Izumi et al. | 95/115 |
| 5,779,768 | 7/1998 | Anand et al. | 95/99 |
| 6,002,019 | 12/1999 | Tamhankar et al. | 549/258 |
| 6,120,581 | * 9/2000 | Markovs et al. | 95/99 |

OTHER PUBLICATIONS

"Activated Carbon Cleanup of the Acid Gas Feed to Claus Sulfur Plants" by L.G. Harruff and S.J. Bushkuhl, presented at the 75$^{th}$ Annual GPA Convention, Mar. 11–13, 1996, Denver, Colorado.

"UOP's Selectox™ Process Improvements in the Technology" by H.W. Gowdy, R.V. Bertram, G.T. Cartwright, R. Sahlin, and L. Laricchia, presented at the 48$^{th}$ Annual Laurance Reid Gas Conditioning Conference, Mar. 1–4, 1998, Norman, Oklahoma.

* cited by examiner

*Primary Examiner*—Robert H. Spitzer
(74) *Attorney, Agent, or Firm*—John G. Tolomei; Frank S. Molinaro; Richard P. Silverman

(57) ABSTRACT

A process is provided for the removal of trace amounts of aromatic hydrocarbons from an acid waste gas feed stream comprising sulfur compounds and the aromatic hydrocarbons. An adsorption process employing an adsorbent such as a high silica zeolite adsorbent having a framework silica-to-alumina ratio greater than about 15 and having a pore size greater than about 6.2 angstroms is used to remove from the feed gas mixture aromatic hydrocarbon contaminants and permit the recovery of a high purity sulfur product from the treated effluent stream. The use of the present invention removes aromatic hydrocarbon contaminants which are responsible for the degeneration of the performance of the downstream sulfur recovery zone.

15 Claims, 3 Drawing Sheets

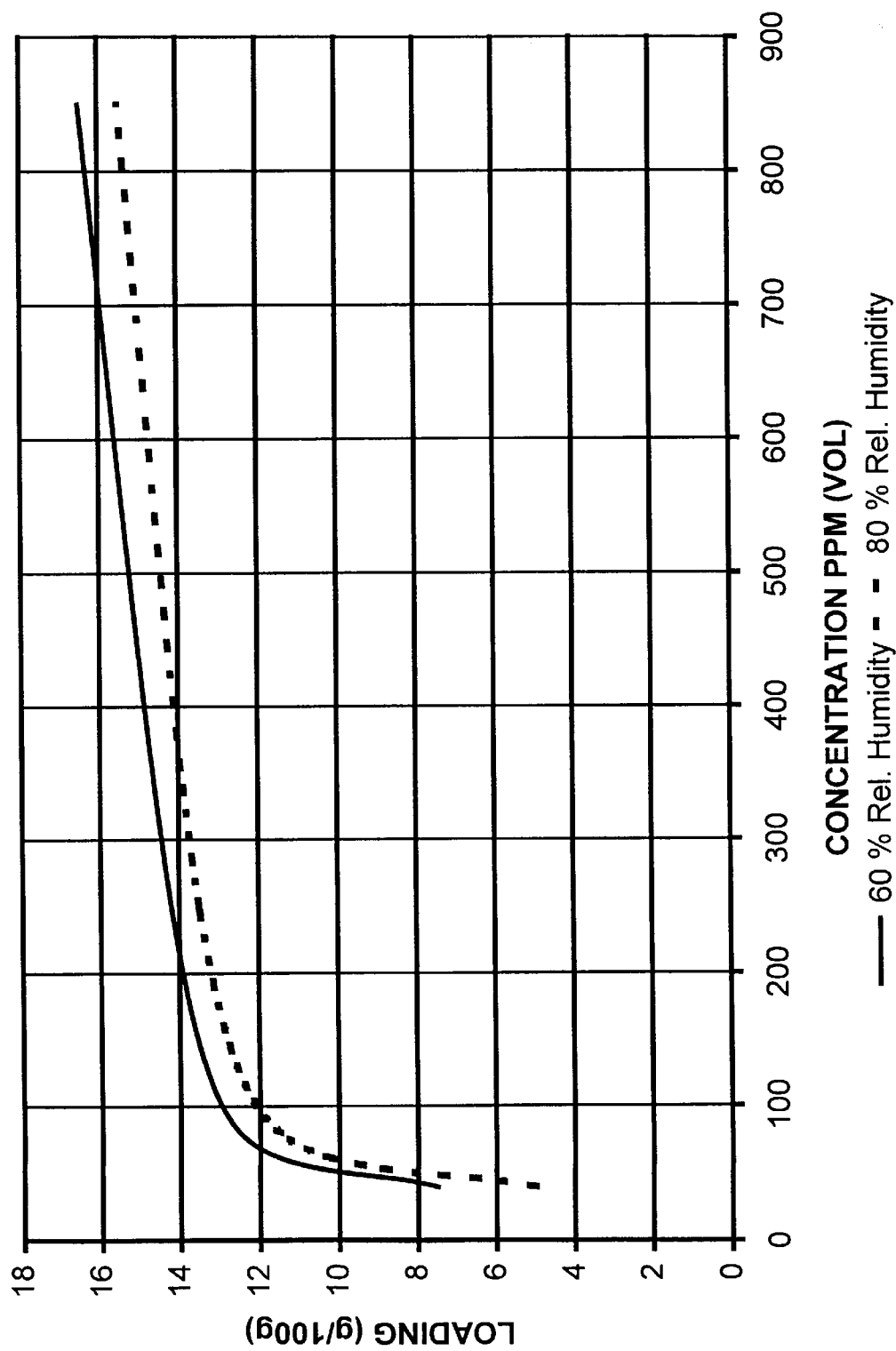
Fig. 2  TOLUENE ADSORPTION ISOTHERM

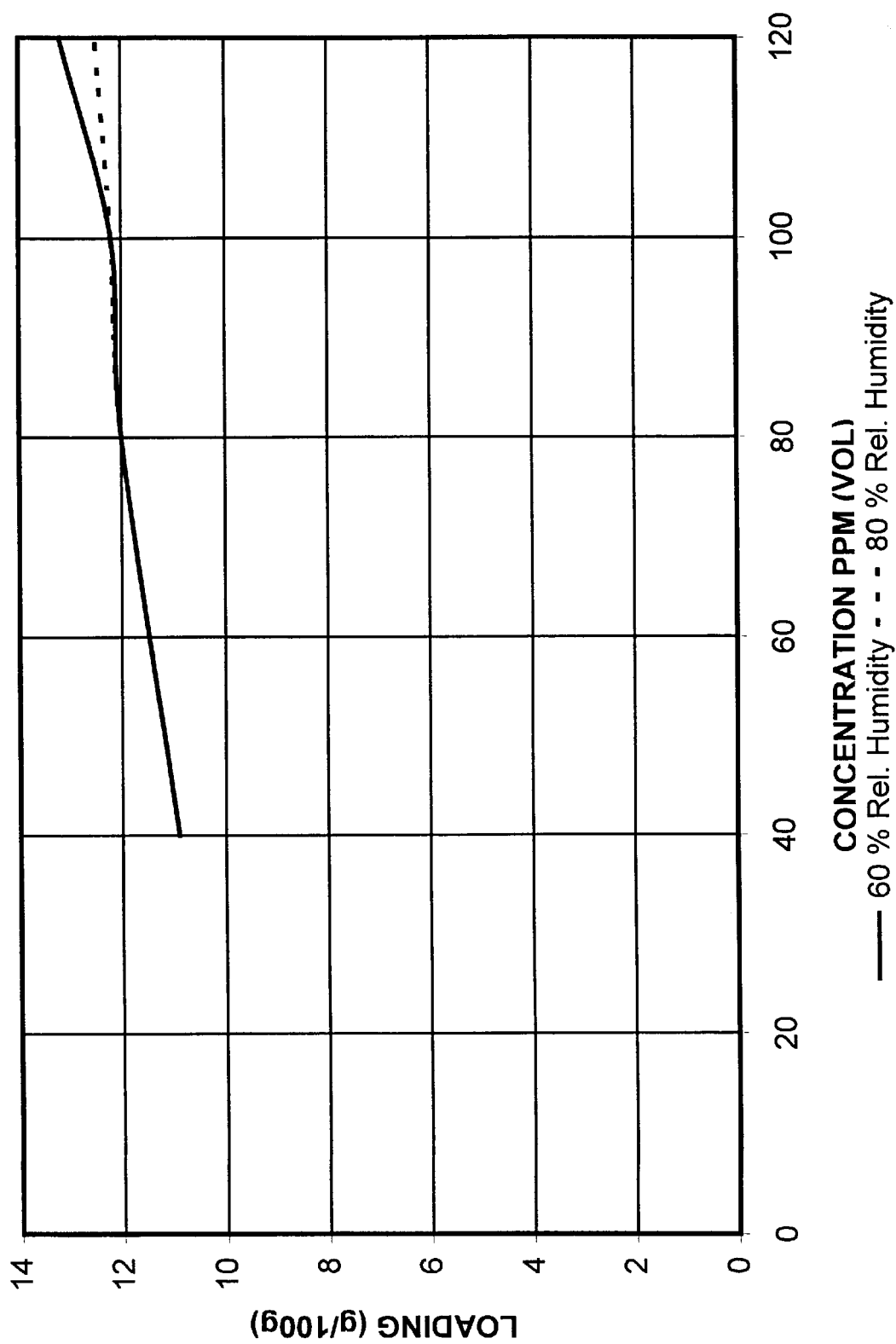
Fig. 3 p-XYLENE ADSORPTION ISOTHERM

SULFUR PRODUCTION PROCESS

CROSS-REFERENCE TO RELATED APPLICATION

This application is a continuation-in-part of application Ser. No. 09/231,359 filed Jan. 13, 1999, now U.S. Pat. No. 6,120,581, the contents of which are hereby incorporated by reference.

FIELD OF INVENTION

The present invention relates to the removal of hydrogen sulfide from gas streams with an aqueous washing solution. More particularly, the invention relates to a method for removing hydrocarbons from a process stream comprising hydrogen sulfide wherein the hydrogen sulfide is subsequently converted to elemental sulfur.

BACKGROUND OF THE INVENTION

Stringent environmental standards of emissions of sulfur and nitrogen compounds, together with low sulfur specifications for petroleum products, have resulted in making sulfur management critical in the operation of the modern refinery and in the recovery of natural gas liquids. Other processes where such sulfur management is important include smelting of various sulfide-containing ores, the sweetening of sour natural gas, destructive distillation of coal and oil shale, gasification or liquefaction of coal, and the production and use of hydrogen sulfide containing geothermal steam and liquid for generating electricity. Modern refineries are processing crude oils with higher sulfur contents and using processing which converts more of the heavier portion of the crude oil. Demands for cleaner fuels and cleaner air will increase the need for more efficient sulfur recovery processes.

Typically, sulfur management within a petroleum refinery comprises two basic processes: amine treating and sulfur recovery. Amine treating units remove hydrogen sulfide from recycle gas streams in hydroprocessing operations and from fuel gas and liquefied petroleum gas recovery units. In recycle gas treating, the sulfur in the crude oil portion reacts with hydrogen at elevated pressure to form hydrogen sulfide. The reactor product stream is flashed and a recycle gas stream containing hydrogen, hydrogen sulfide, and some hydrocarbons is sent to an amine adsorber wherein the hydrogen sulfide is removed by the circulating amine stream. In fuel gas and liquefied petroleum gas recovery units, the off-gases and stabilizer overheads from other refinery process units such as cracking, coking, and reforming units are sent to gas recovery units to collect the gas streams. Hydrogen sulfide is removed from the collected gas stream at low pressure by the circulating amine. In either case, the gas withdrawn from the amine units, an aqueous process, is a water-saturated acid gas which generally comprises carbon dioxide, hydrogen sulfide, and traces of aromatic hydrocarbons.

The effluent from the amine treating unit is passed to a sulfur recovery unit which typically converts the hydrogen sulfide to elemental sulfur. The widely used Claus sulfur recovery process comprises a thermal recovery stage followed by two or three stages of catalytic recovery. In the thermal recovery stage, the acid gas is burned in a reaction furnace with air or oxygen to combust approximately one-third of the hydrogen sulfide plus any hydrocarbons and ammonia in the acid gas. The sulfur dioxide from the combustion reacts in the reaction stages with the unconverted hydrogen sulfide to form elemental sulfur. The products of both the combustion and the reaction are cooled in a waste heat boiler and thermal sulfur condenser to recover the sulfur. The catalytic recovery zones contain an alumina catalyst which can suffer significant reduction in activity and selectivity when aromatic hydrocarbons are present in the waste gas feed stream. In a paper entitled, "Activated Carbon Cleanup of the Acid Gas Feed to Claus Sulfur Plants", by Lewis G. Harruff and Stephen J. Buskuhl, which was presented at the 75th Annual Gas Processing Association Convention in Denver, Colo., Mar. 11–13, 1996, the problem of aromatic hydrocarbons in waste gas feed streams to a Claus unit is disclosed. The authors employ an activated carbon adsorbent guard bed to remove the aromatic hydrocarbons. The authors point out the advantage of removing the aromatic hydrocarbons, but also indicate that the relative humidity of the waste feed stream must be maintained below 50 percent at which point the adsorption efficiency of the activated carbon drops off dramatically.

A number of other sulfur recovery processes in commercial use for removing hydrogen sulfide from waste gas feed streams include processes wherein the hydrogen sulfide is oxidized in the gas phase or in an aqueous liquid phase. One vapor phase process, known in the art as the Selectox Process is disclosed in U.S. Pat. No. 4,528,277 and U.S. Pat. No. 4,576,814 which are hereby incorporated by reference. These patents disclose the use of a catalyst comprising bismuth and vanadium components supported on a hydrophobic crystalline material. The catalyst is highly active and stable, especially in the presence of water vapor, for oxidizing hydrogen sulfide to sulfur or sulfur dioxide by the reaction of the hydrogen sulfide with oxygen.

Another example of a hydrogen sulfide removal process is the Stretford process which is disclosed in U.S. Pat. No. 4,892,723 and hereby incorporated by reference. The Stretford process produces a high purity sulfur product in an aqueous washing solution which absorbs and oxidizes hydrogen sulfide. The washing or absorption step is typically performed with a water-soluble organic alkaline agent, such as anthraquinone disulphonic acid (ADA), with the hydrogen sulfide being oxidized to particles of elemental sulfur by an oxidation promoter such as a pentavalent vanadium compound such as sodium vanadate ($NaVO_3$). Recovery of the sulfur is obtained by floatation, using a stream of air which is injected into the process solution. This air injection generates a frothy slurry containing the sulfur particles. The sulfur particles rise to the top of the solution where they are skimmed off and recovered by filtration or other liquid/solid separation techniques. In this process, the oxygen in the injected air also serves to re-oxidize the reduced vanadate ions, thereby regenerating the aqueous alkaline washing solution for reuse in the process. U.S. Pat. No. 4,283,379 describes a similar process wherein the washing solution comprises a solubilized vanadium salt as the oxidizer, a non-quinone aromatic absorption compound, thiocyanate ions, and a water soluble carboxylate complexing agent. Other processes are based on the use of other metallic oxidizers such as ferric iron and soluble arsenates and stannates. One relatively recent process disclosed in U.S. Pat. No. 5,354,545 discloses a process for removal of sulfur compounds from a gas feed stream wherein the stream is contacted with an aqueous solution containing sulfide oxidizing bacteria in the presence of oxygen to oxidize the hydrogen sulfide to elemental sulfur.

A commonly used technique to remove the sulfur particles from aqueous solutions is by circulating the washing solution through a tank-like oxidizer vessel, through which air is bubbled to re-generate the washing solution and form a frothy slurry. When these solutions are fresh, the elemental sulfur particles which are formed have an average diameter ranging between about 0.5 and about 5.0 microns. These particles typically agglomerate to form sulfur clumps of about 10 to about 150 microns in size. Such agglomerated particles are readily buoyed up to the surface of the froth and pass-through a weir-like opening near the top of the vessel into a sulfur collection vessel. Here, the bubbles in the froth readily collapse, and resultant liquid suspension or slurry can easily be pumped to a sulfur separation device such as a rotary vacuum filter, filter press, or centrifuge, from which, after washing to remove the entrained process solution, an extremely pure grade of sulfur is obtained. Where a non-particulate form of sulfur is desired, a washed filter cake may be sent to an autoclave or other sulfur melter.

A problem which was pointed out in U.S. Pat. No. 4,892,723 and in the above-mentioned article related to the Claus process is the introduction of contaminants such as aromatic hydrocarbons having from six to eight carbon atoms per molecule. These hydrocarbons may be introduced by the incomplete or improper combustion of the sulfur contaminated waste stream in an oxidation step, or by the incomplete separation in a process plant, such as the amine unit, supplying the basic feedstock for this process. When these contaminants appear, even in trace amounts, they accelerate the rate of formation of certain contaminants such as thiosulfates in the washing solution which result in the promotion of long-lasting, highly stable foams in the oxidizer vessel, which causes the formation of "sticky" sulfur particles and makes the subsequent sulfur separation and washing in the filter quite difficult. In U.S. Pat. No. 4,892, 723, the solution to the problem was the contacting by at least a portion of the incoming contaminated gas stream or the already contaminated washing solution with a charcoal or other carbonaceous adsorbent useful for removing the contaminants. The solution in the Claus process was also the use of an activated carbon guard bed to adsorb the aromatic hydrocarbons. Unfortunately, such carbonaceous adsorbents become ineffective when both aromatic hydrocarbons and water are present in the gas stream containing the hydrogen sulfide.

Generally, thermal swing processes utilize the process steps of adsorption at a low temperature, regeneration at an elevated temperature with a hot purge gas and subsequent cooling down to the adsorption temperature. One process for drying gases generally exemplary of thermal swing processes is described in U.S. Pat. No. 4,484,933 issued to Cohen. The patent describes basic thermal swing processing steps coupled with the use of an auxiliary adsorber bed for improving the regeneration step. Thermal swing processes are often used for drying gases and liquids and for purification where trace impurities are to be removed. Often, thermal swing processes are employed when the components to be adsorbed are strongly adsorbed on the adsorbent, i.e., water, and thus, heat is required for regeneration.

Improved processes are sought which permit the adsorption of the aromatic hydrocarbons in the presence of water and other competing species from the waste gas stream which already contains high levels of hydrogen sulfide and acid gases such as carbon dioxide. It is the object of the present invention to provide an improved sulfur production process which is not limited by the presence of water or aromatic hydrocarbons, or aromatic hydrocarbons in the presence of water in producing a high purity sulfur product.

SUMMARY OF THE INVENTION

The present invention relates to a process in which an incoming hydrogen sulfide-containing gas stream is contacted with a catalyst to convert the hydrogen sulfide to elemental sulfur. The gas stream contains organic contaminants, particularly one or more low molecular weight hydrocarbons such as aromatic hydrocarbons having about 6 to about 8 carbon atoms per molecule such as benzene, toluene, and $C_8$ aromatics such as ethyl benzene and the para-, meta-, and ortho-isomers of xylene. The instant invention provides a process for removing the hydrocarbon contaminants from the incoming gas stream. The present invention employs an adsorption process containing a high silica zeolite molecular sieve adsorbent to remove the trace amounts of aromatic hydrocarbons and water from the incoming or waste gas stream which permits the production of a high purity sulfur product in downstream sulfur recovery units.

In one embodiment, the present invention is a process for the rejection of trace amounts of aromatic hydrocarbons from an acid waste gas feed stream comprising hydrogen sulfide, carbon dioxide, water and the aromatic hydrocarbons. The process comprises passing the acid waste gas feed stream comprising a substantial amount of acid gas at effective adsorption conditions through a high silica zeolite adsorbent effective for the adsorption of said aromatic hydrocarbons and water to provide a treated effluent stream essentially free of said aromatic hydrocarbons.

In another embodiment, the present invention is a process for the rejection of trace amounts of aromatic hydrocarbons from an acid waste gas feed stream comprising hydrogen sulfide, water, carbon dioxide, and the aromatic hydrocarbons. The process comprising a series of steps. The acid waste gas feed stream at effective conditions including an adsorption pressure is contacted in an adsorption zone containing a high silica zeolite adsorbent to adsorb at least a portion of said aromatic hydrocarbons and water to provide a treated effluent stream essentially free of the aromatic hydrocarbons. The pressure in said adsorption zone is increased to a desorption pressure and the high silica adsorbent is regenerated with a heated regeneration gas stream to desorb the aromatic hydrocarbons. The adsorption zone is depressurized to the adsorption pressure and the above steps are repeated to provide a continuous process.

In a further embodiment, the present invention is a continuous process for rejecting trace amounts of aromatic hydrocarbons from an acid waste gas feed stream comprising said aromatic hydrocarbons, water, hydrogen sulfide and carbon dioxide. The process comprises a series of steps. The acid waste gas feed stream at effective adsorption conditions including an adsorption temperature and an adsorption pressure is passed to a first adsorption zone of at least two adsorption zones. Each adsorption zone contains a regenerable adsorbent comprising a high silica zeolite. The regenerable adsorbent is selective for the adsorption of the aromatic hydrocarbons and water. The adsorption step provides a treated effluent stream essentially free of said aromatic hydrocarbons. A second adsorption zone is depressurized from a desorption pressure to the adsorption pressure. The second adsorption zone had completed a desorption step and is at a desorption temperature which is higher than the adsorption temperature. The acid waste gas feed stream is passed to the second adsorption zone to purge and cool the second adsorption zone. A warm purge stream is withdrawn from the second adsorption zone. The warm purge stream is cooled to provide a cooled purge stream and the cooled purge stream is passed to the first adsorption zone and the treated effluent stream is withdrawn therefrom until the second adsorption zone is returned to the adsorption temperature. The passing of the acid waste gas feed stream to the first adsorption zone is terminated and the treated effluent is withdrawn from the second adsorption zone. The first adsorption zone is pressurized to a desorption pressure which is higher than the adsorption pressure with a high pressure make up gas stream. A heated regeneration gas at a desorption temperature is passed to the first adsorption zone to desorb the aromatic hydrocarbons and water in the desorption step and to produce a regeneration effluent stream. The regeneration effluent stream is cooled and at least partially condensed to provide a water stream, an aromatic hydrocarbon stream and a spent regenerant gas stream. At least a portion of the spent regenerant stream is heated to provide the heated regenerant stream. The above steps are repeated to provide the continuous process.

BRIEF DESCRIPTION OF THE DRAWINGS

FIG. 2 is an adsorption isotherm for toluene over a high silica zeolite adsorbent.

FIG. 3 is an adsorption isotherm for p-xylene over a high silica zeolite adsorbent.

DETAILED DESCRIPTION OF THE INVENTION

Figure 1:
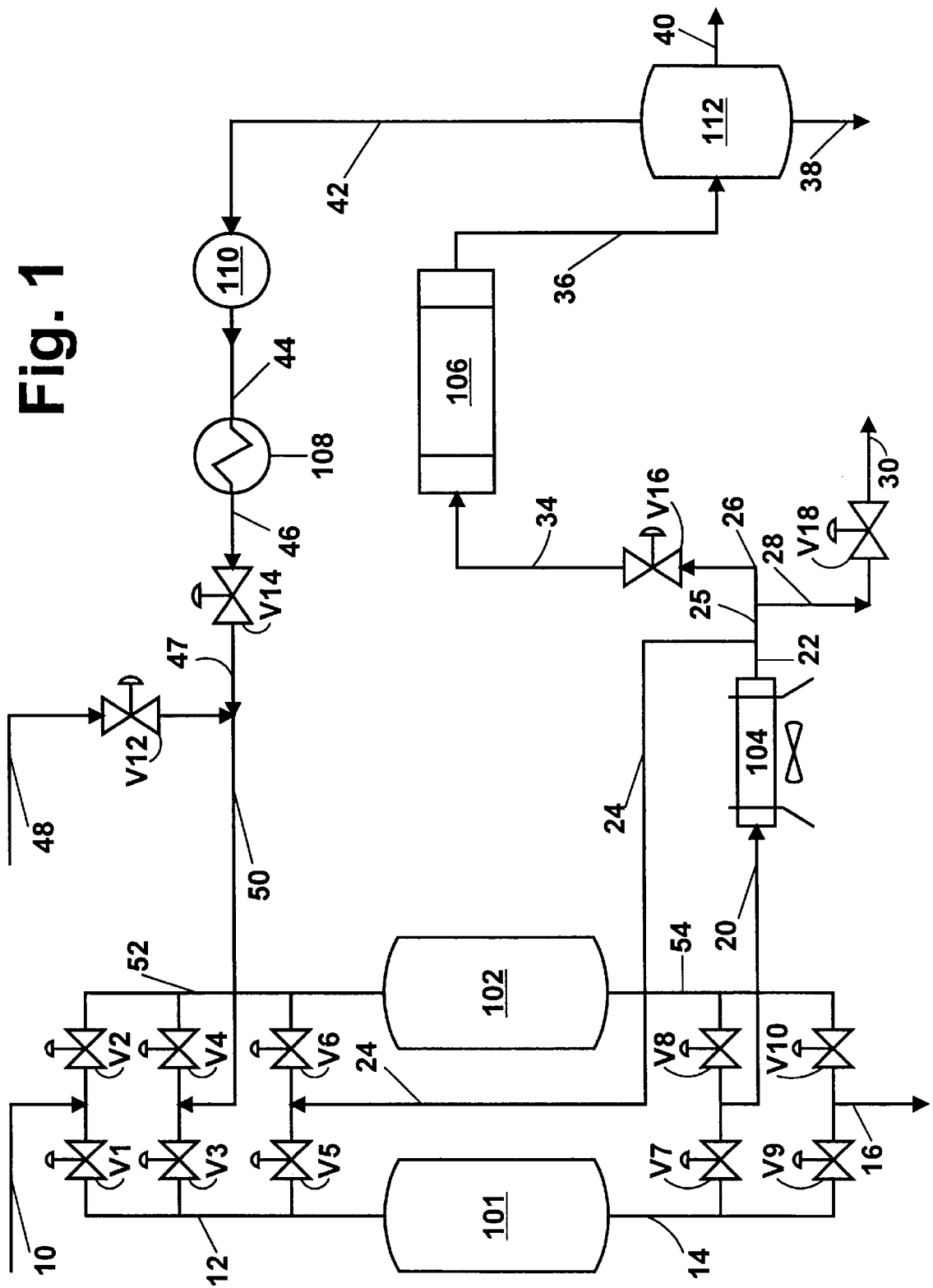
FIG. 1 is a flow diagram of the process of the present invention.

The invention is useful for the rejection of aromatic hydrocarbons from a sulfur-laden waste gas feed stream over a regenerable adsorbent to provide a purified waste gas stream which can be subsequently processed in a sulfur recovery unit for the production of a high purity sulfur product. Generally, the waste gas feed stream has been processed in an amine treating unit as described in Chapter 11.1 of the book entitled, *Handbook of Petroleum Refining Processes*, edited by Robert A. Meyers, Second Edition, published by McGraw Hill (New York) in 1996, which is hereby incorporated by reference. The amine treating units remove hydrogen sulfide from gas streams by absorption with aqueous solutions of amines such as monoethanol amine, diethanol amine, and methyl diethanol amine to achieve treated fuel gases comprising less than about 160 ppm-vol hydrogen sulfide, and more particularly to produce fuel gases with less than about 10 ppm-vol hydrogen sulfide and liquefied petroleum gas with less than about 50 ppm-wt hydrogen sulfide. Although the amine absorption will remove a significant portion of any aromatic hydrocarbons in the feed to the amine unit, the waste gas stream produced by the amine unit will comprise about 3 percent of the aromatic hydrocarbons that enter the amine unit with the feed to the amine unit. Although the process of the present invention may be applied in front of the amine unit (on the feed to the amine unit) or on the waste gas produced by the amine unit, it is preferred to process the waste gas stream produced by the amine unit. If a portion of the waste gas feed stream to be processed in the adsorption unit comprises aromatic hydrocarbons which need not be recovered, the waste gas, at effective conditions, is contacted with the adsorbent in an adsorption zone of the present invention to adsorb the aromatic hydrocarbons and water and to produce a treated waste stream essentially free of aromatic hydrocarbons. The adsorbent is subsequently desorbed in a thermal swing cycle at an effective regeneration temperature with a heated fuel gas stream. The spent regeneration gas is withdrawn from the adsorption zone and cooled to ambient conditions, typically about 27° to about 37° C. (80° to about 100° F.). A portion of the cooled, spent regeneration gas stream comprising aromatic hydrocarbons is passed to the fuel gas system for use as fuel. Upon cooling the spent regeneration gas stream, some of the desorbed water is condensed and withdrawn to sour water disposal. To prevent the re-introduction of the aromatic hydrocarbons to the downstream sulfur recovery plant, the regeneration is carried out in a partially closed cycle wherein a make-up fuel gas stream is combined with a portion of the cooled, spent regeneration gas stream and heated to provide the heated fuel gas stream. In returning the newly regenerated adsorption zone to adsorption service, the waste gas feed stream is introduced to the feed end of the newly regenerated adsorption zone to cool the adsorption zone and the hot effluent is cooled and passed to another adsorption zone operating in the adsorption mode. This lead/trim operation is continued until the regenerated bed reaches effective adsorption conditions, at which time the other adsorption bed in the trim position is regenerated to provide a continuous process. When no fuel is required or when it is desired to recover the aromatic hydrocarbons, the regeneration procedure is altered. Aromatic hydrocarbons adsorbed on the adsorbent present the problem that when the adsorbent is desorbed at low pressure, the portion of the aromatic hydrocarbons which are condensable is high and the condensation of these hydrocarbons may adversely affect the operation of the adsorption unit. The purified waste gas stream produced by the process of this invention is essentially free of aromatic hydrocarbons such as $C_6$ to $C_8$ hydrocarbons, such as benzene, toluene, and isomers of xylene, where essentially free means a concentration of aromatic hydrocarbons which is less than 500 ppm-vol, and preferably where the concentration of aromatic hydrocarbons is less than about 250 ppm-vol. More preferably, the concentration of aromatic hydrocarbons ranges between about 250 ppm-vol and about 500 ppm-vol. The purified waste gas stream may be passed to an oxidative sulfur recovery unit to provide a high purity sulfur product. A further advantage of the present invention is that water removed from the waste gas feed stream by the adsorption process may be returned to the amine unit to replenish water removed from the amine solution during the amine absorption step.

The thermal swing process of the present invention relates to conventional thermal swing processing in which each bed of an adsorption zone undergoes, on a cyclic basis, adsorption at an adsorption temperature wherein the more readily adsorbable component(s) in the feed stream are selectively adsorbed to provide an adsorption effluent stream enriched in the less readily adsorbable components, regeneration at a desorption temperature that is higher than the adsorption temperature which is conducted by passing a purge gas at an elevated temperature, i.e., equal to or higher than the desired desorption temperature through the bed, and cooling the bed to the adsorption temperature by passing a purge gas therethrough. Such process steps are disclosed, for example, in above-cited U.S. Pat. No. 4,484,933 hereby incorporated by reference. Generally, thermal swing processes are carried out such that the adsorption steps take place at about the same adsorption and desorption pressures, or that the adsorption pressure is generally higher than the desorption pressure. In the present invention to recover the aromatic hydrocarbons as liquids, the adsorption takes place at a low adsorption pressure relative to the desorption pressure.

Typically, the waste gas feed stream comprises carbon dioxide, sulfur compounds, and water. The sulfur compounds in the waste gas typically include hydrogen sulfide, sulfur dioxide, carbonyl sulfide, and mercaptans. Hydrogen sulfide generally comprises more than about 95 vol-% of the total sulfur in the waste gas feed stream. The waste gas stream typically comprises a substantial amount of acid gases, particularly hydrogen sulfide and carbon dioxide, wherein a substantial amount of acid gas means that the concentration of hydrogen sulfide and carbon dioxide together comprise at least about 60 mol-%. More preferably, the concentration of hydrogen sulfide and carbon dioxide together comprise at least about 80 mol-%, and most preferably, the concentration of hydrogen sulfide and carbon dioxide together comprise at least about 90 mol-%. Preferably, the hydrogen sulfide concentration in the waste gas stream will range from about 0.5 to about 95 mol-%, and the carbon dioxide concentration will range from about 10 to about 95 mol-%. Preferably, the total amount of aromatic hydrocarbons in the waste gas stream comprises a concentration ranging from about 300 to about 3000 ppm-vol. More preferably, the waste gas comprises about 400 to about 2000 ppm-vol aromatic hydrocarbons and most preferably, the waste gas comprises less than about 2000 ppm-vol aromatic hydrocarbons. Typically, the waste gas is saturated with water as it leaves the amine unit. Preferably, the water in the waste gas stream corresponds to a relative humidity of at least 25% at 35° C. (95° F.). The waste gas is available at a pressure ranging from about 167 kPa to about 300 kPa (25 to about 45 psia). The adsorption takes place at effective conditions including an adsorption pressure ranging from about 167 kPa to about 310 kPa (25 to about 45 psia) and an adsorption temperature ranging from about 5° to about 65° C. (about 40° to about 150° F.). The desorption step of the present invention is carried out at a higher pressure than the adsorption pressure in order to collect and condense the recovered aromatic hydrocarbons desorbed from the adsorbent. Preferably, the desorption step of the present invention takes place at a desorption pressure ranging from about 315 kPa to about 1.38 MPa (about 45 to about 215 psia), and more preferably the desorption step takes place at a desorption pressure greater than or equal to about 790 kPa (115 psia). The desorption step is carried out at a desorption temperature which is effective to desorb the aromatic hydrocarbons from the adsorbent. Preferably, the desorption temperature ranges from about 100° to about 300° C. (about 210° to about 570° F.), and more preferably, the desorption temperature ranges from about 150° to about 260° C. (about 300° to about 500° F.).

It is to be understood that the adsorption zones of the present invention contain adsorption beds containing adsorbent suitable for adsorbing the particular components to be adsorbed therein. As the capacity of the adsorber bed for the more readily adsorbable component is reached, that is, preferably before a substantial portion of the leading adsorption front has passed through the first adsorption bed, the feed stream is directed to another bed in the adsorption zone. It is to be also understood that the term "countercurrent" denotes that the direction of gas flow through the adsorption bed, is countercurrent with respect to the direction of feed stream flow. Similarly, the term "cocurrent" denotes flow in the same direction as the feed stream flow. The purge gas is at least partially comprised of an effluent stream, e.g., the adsorption effluent stream from the adsorption bed, which comprises the less readily adsorbable component. The term "enriched" is intended to be with reference to the feed stream composition unless otherwise noted.

It will also be understood that the invention can be carried out using an adsorbent material in the adsorption bed having, a selectivity for various components of a feed stream over other such components, thereby providing a less readily adsorbable component and a more readily adsorbable component. In the present invention, the more readily adsorbable components are aromatic hydrocarbons and water, and the less readily adsorbable components are hydrogen sulfide and carbon dioxide. Adsorbents known in the art and commercially available include crystalline molecular sieves, activated carbons, activated clays, silica gels, activated aluminas, polymeric resins, and mixtures thereof. Polymeric resins for hydrocarbon adsorption are generally macroreticular resins based on styrene-divinylbenzene copolymers. The crystalline molecular sieves include zeolitic molecular sieves.

Zeolitic molecular sieves in the calcined form may be represented by the general formula:

$$Me_{2/n}O:Al_2O_3:xSiO_2$$

where Me is a cation, x has a value from about 2 to infinity, and n is the cation valence. High silica zeolites which may be used include: clinoptilolite, boggsite, EMC-2, zeolite L, ZSM-5, ZSM-11, ZSM-18, ZSM-57, EU-1, offretite, faujasite, ferrierite, mordenite, zeolite Beta, and silicalite. The adsorbent of the present invention will be selected from high silica zeolite adsorbents and mixtures thereof. It is desirable to reduce the aluminum content in the zeolite framework or structure, thereby reducing, the affinity of water to the zeolite while retaining its ability to retain its hydrocarbon adsorption capacity in the presence of fairly high moisture levels. For these reasons, zeolites suitable for use according to the present invention are those having a high silica content, i.e., those having framework silica-to-alumina ratios preferably greater than 15. The term "framework silica-to-alumina ratio" refers only to the aluminum and silicon atoms which are tetrahedrally coordinated within the zeolite structure. Preferably, adsorbents which are naturally occurring or are synthetically produced with a framework silica-to-alumina ratio less than about 15 will be modified by conventional means such as steaming, acid extraction, fluoride treatment and the like to increase the framework silica-to-alumina ratio to greater than about 15. Faujasites having a framework silica-to-alumina ratio greater than 15 are preferred for use with the present invention. The preferred adsorbents for use with the present invention include synthetic and naturally occurring zeolites with a framework silica-to-alumina ratio greater than 15 and having a pore opening of at least about 6.0 angstroms and, preferably, larger than about 6.2 angstroms. More particularly, synthetic and naturally occurring zeolites having a FAU structure as defined in the "Atlas of Zeolite Structure Types," by W. M. Meier and D. H. Olson, issued by the Structure Commission of the International Zeolite association, (1987), on pages 53–54 and pages 91–92, are preferred. The above reference is hereby incorporated by reference. Detailed descriptions of some of the above-identified zeolites may be found in D. W. Breck, *Zeolite Molecular Sieves*, John Wiley and Sons, New York, 1974, hereby incorporated by reference.

The term "pore opening" refers to the pore diameter of the adsorbent within the crystal structure of the adsorbent. Zeolite molecular sieves have pores of uniform opening, ranging from about 3 to about 10 angstroms, which are uniquely determined by the unit structure of the crystal. These pores will completely exclude molecules which are larger than the opening of the pore. For example, linear paraffins are separated from branched-chain and cyclic hydrocarbons by adsorption on a so-called 5A molecular sieve. The pore opening is such that among the hydrocarbons only linear molecules can pass, while branched-chain molecules are excluded. The pore opening of naturally occurring zeolites and synthetically produced zeolitic molecular sieves may be increased by any conventional means such as cation exchange, acid leaching, and the like.

Adsorbents suitable for the process of the present invention may comprise Zeolite Y or various modifications of Zeolite Y in a refractory inorganic oxide matrix. Zeolite Y can be modified for example by increasing the molar ratio of silica to alumina. U.S. Pat. No. 4,869,803 describes an improved method of calcining zeolites. This patent presents characterizations of Y-82, LZ-10 and LZ-20 zeolites in columns 7–8 and is incorporated herein by reference for its teaching regarding the preparation, characterization and distinguishing features of each of these materials. This reference refers to the U.S. Pat. No. 4,401,556 issued to R. D. Bezman and J. A. Rabo disclosing an ultrahydrophobic Zeolite Y (UHP-Y) characterized by having a silica-to-alumina molar ratio of from 4.5 to 35, the essential X-ray powder diffraction pattern of zeolite Y, an ion exchange capacity of not greater than 0.070, a unit cell dimension of from 24.20 to 24.45 angstroms, a surface area of at least 350 $m^2/g$ (B-E-T), a sorptive capacity for water vapor at 25° C. of from 2 to 4 wt-% at a p/p/° value of 0.10, and a Residual Butanol Test value of not more than 0.40 wt-%. This reference has been referred to in the art as describing the preparation of the zeolite sold under the LZ-10 trademark. LZ-20 is prepared in a similar manner to LZ-10, except that the final calcination takes place in a single step. Zeolite LZ-15 is prepared in a similar manner as zeolite LZ-20, but LZ-15 has a lower water capacity than zeolite LZ-20. The specifications for LZ-20 are a $SiO_2/Al_2O_3$ ratio of 5.0 to 6.0 (by bulk chemical analysis), a surface area of from 580 to 650 $m^2/g$ (B-E-T), a unit cell dimension of from 24.33 to 24.41 angstroms, and a sorptive capacity for water vapor of from 3.0 to 5.5 pounds of water per 100 pounds of adsorbent. Zeolites LZ-10, LZ-20, and LZ-15 are available from UOP in Des Plaines, Ill. The framework silica-to-alumina ratios for these high silica zeolites are as follows:

| ZEOLITE | Framework Silica-to-Alumina Ratio |
| --- | --- |
| LZ-10 | 30–60 |
| LZ-15 | 28–66 |
| LZ-20 | 13–22 |

It is often desirable when using crystalline molecular sieves that the molecular sieve be agglomerated with a binder in order to ensure that the adsorbent will have suitable particle size. Although there are a variety of synthetic and naturally occurring binder materials available such as metal oxides, clays, silicas, aluminas, silica-aluminas, silica-zirconias, silica-thorias, silica-berylias, silica-titanias, silica-alumina-thorias, silica-alumina-zirconias, mixtures of these and the like, silica binders are preferred. Clay binders are preferred, and silica is more preferred because silica may be employed to agglomerate the molecular sieve without substantially altering the adsorptive properties of the zeolite. The choice of a suitable binder and methods employed to agglomerate the molecular sieves are generally known to those skilled in the art and need not be further described herein.

It was determined by experimental means that high silica zeolites, such as LZ-10, did not exhibit a sharp reduction in adsorbent loading of aromatic hydrocarbons in humid air, particularly for air having a relative humidity greater than about 50 percent, and more particularly for air having a relative humidity between about 50 and about 80 percent relative humidity.

DETAILED DESCRIPTION OF THE DRAWINGS

The process of the present invention is hereinafter described with reference to FIG. 1 which illustrates various aspects of the process. It is to be understood that no limitation to the scope of the claims which follow is intended by the following description. Those skilled in the art will recognize that this process flow diagram has been simplified by the elimination of many necessary pieces of process equipment including some heat exchangers, process control systems, pumps, fractionation systems, etc. It may also be discerned that the process flow depicted in FIG. 1 may be modified in many aspects without departing from the basic overall concept of the invention.

With reference to FIG. 1, a waste gas feed stream comprising sulfur compounds, water and carbon dioxide with trace amounts of aromatic hydrocarbons is passed via line 10, valve V1, and line 12 to an adsorption zone 101. In this context, trace amounts of aromatic hydrocarbons means that the acid waste gas stream contains between 1 and 5000 ppm volume aromatic hydrocarbons. In the adsorption zone 101, the waste gas feed stream is contacted with an adsorbent selective for the adsorption of the aromatic hydrocarbons. An adsorption effluent stream is withdrawn from adsorption zone 101 in line 14 and passed through valve V9 and line 16, and withdrawn from the process as a treated waste stream in line 16. The treated waste stream contains a reduced amount of aromatic hydrocarbons relative to the amount of aromatic hydrocarbons in the waste gas feed stream. At a point in the process, prior to the breakthrough of aromatic hydrocarbons from adsorption zone 101, valve V1 is closed and valve V2 is opened, allowing the waste gas feed stream to pass through the valve V2, line 52 and enter previously regenerated adsorption zone 102. The adsorption effluent withdrawn from adsorption zone 102 in line 54 is passed through valve V8, line 20, air cooler 104, line 22, line 24, valve V5, and line 12 in a displacement step to purge the regenerated adsorption zone 102 of any residual aromatic hydrocarbons and pass the residual aromatic hydrocarbons to adsorption zone 101. This displacement step avoids the release of a slug or a peak concentration of aromatic hydrocarbons to downstream processes for sulfur recovery. At the conclusion of the displacement step, valve V8 is closed and the adsorption effluent from adsorption zone 102 is passed through line 54, valve V10, and is withdrawn as the treated product stream in line 16. At this point in the process, adsorption zone 101 is isolated from the waste gas feed stream by closing valves V5 and V9 and a pressurization step is begun wherein the adsorption zone 101 is raised to the desorption pressure, which is greater than the adsorption pressure. In the process of the instant invention, it is necessary to raise the pressure of the desorption step over the considerably lower adsorption pressure in order to effectively remove the aromatic hydrocarbons from the spent regeneration gas. In the pressurization step, with valve V9 closed, valves V7 and V12 are opened and a make up gas stream, available at a high pressure and selected from the group consisting of natural gas, nitrogen, carbon dioxide, and mixtures thereof, is passed in line 48, valve V12, line 47, line 50, valve V3, and line 12 to adsorption zone 101. Valve V12 permits a portion of the make up gas stream to undergo a pressure reduction to about the adsorption pressure and gradually raises the pressure in adsorption zone 101 to the desorption pressure in the pressurization step. When adsorption zone 101 has reached the desired desorption pressure a closed regeneration step is performed. In the closed regeneration step, a regeneration effluent stream is withdrawn from adsorption zone 101 in line 14 and passed through valve V7 and line 20 to air cooler 104 which at least partially cools the regeneration effluent stream to provide a cooled regeneration effluent in line 22. The cooled regeneration effluent at a cool temperature ranging from about 35° to about 65° C. (100° to about 150° F.) in line 22 is passed via lines 22, 25, 26, valve V16 and line 34 to a chiller 106. The chiller 106 further reduces the cooled regenerant effluent stream to a refrigerated temperature ranging from about 0° to about 15° C. (about 33° to about 60° F.) to at least partially condense the aromatic hydrocarbons and water and to provide a refrigerated effluent stream in line 36. The refrigerated effluent stream is passed to condenser 112 for phase separation wherein the condensed water is withdrawn as a water stream in line 38, and the condensed aromatic hydrocarbons are withdrawn as an aromatic hydrocarbon stream in line 40. The uncondensed portion of the refrigerated effluent stream, or spent regenerant gas is withdrawn from the condenser 112 and passed in line 42 to compressor 110 which restores the pressure of the spent regenerant gas stream to a pressure about the same as the desorption pressure to provide a pressurized regeneration gas stream in line 44. The pressurized regeneration gas stream is passed to heater 108 to raise the pressurized regeneration gas to the effective desorption temperature and provide a hot regeneration gas stream in line 46. The hot regeneration gas stream is passed to the first adsorption zone 101 via line 46, valve V14, line 47, line 50, valve V3, and line 12 to complete the closed regeneration loop. The regeneration step is carried out for a period of about 0.5 to about 8 hours, and more preferably the regeneration step is carried out for a period ranging from about 0.5 to about 2 hours to desorb the aromatics and water from the adsorbent in the first adsorption zone 101, while the second adsorption zone 102 is adsorbing aromatic hydrocarbons from the waste gas feed stream in an adsorption step. At the conclusion of the regeneration step, valves V14 and V16 are closed, separating the first adsorption zone 101 from the refrigeration and heating sections of the process. The first adsorption zone 101 undergoes a depressurization step by releasing a depressurization gas through valve V7, line 20, air cooler 104, lines 22 and 24, and valve V6 into the feed gas line 52 to the inlet end of the second adsorption zone 102 from which the treated effluent stream is withdrawn in line 54, valve V10, and line 16. Following the depressurization step, the first adsorption zone 101 undergoes a cool down step wherein the waste gas feed stream in line 10 is introduced to the first adsorption zone 101 via line 10, valve V1, and line 12 and a warm purge stream is withdrawn in line 14 and passed to the air cooler 104 via line 14, valve V7, and line 20 to produce a cooled purge stream in line 22. The cooled purge stream in line 22 is passed to the second adsorption zone 102 via lines 24, valve V6 and line 52 and the effluent stream from the second adsorption zone 102 is withdrawn via lines 54, valve V10, and line 16 as the treated waste gas stream. Thus, the second adsorption zone 102 acts as a trim, or secondary, adsorption zone while the temperature of the first adsorption zone 101 is reduced to the effective adsorption temperature. This lead/trim configuration of the adsorption zones during the cool down step prevents plant upsets such as permitting a slug of aromatic hydrocarbons to be carried to downstream sulfur recovery units. The advantage of this lead/trim configuration is that any of the aromatic hydrocarbons remaining on the newly regenerated adsorbent will be stripped off with the increased gas flow during depressurization are captured on the bed in the trim position.

The total cycle time for the process of the present invention can vary from about 1 to about 24 hours, where the total cycle time is the time for the process to undergo an adsorption and desorption cycle. Preferably, the total cycle time ranges from about 2 to about 8 hours. The process of the present invention is carried out with at least two adsorption beds, wherein one bed undergoes the adsorption step and the other bed undergoes the closed regeneration steps of pressurization, heating, depressurization and cooling, wherein the cooling step places the most recently heated adsorption zone in the lead position of a lead/trim configuration.

During the regeneration of the second adsorption zone 102, the make up gas at the desorption pressure is introduced to the second adsorption zone 102 via line 48, valve V12, line 50, valve V4, and line 52, and the regeneration effluent is withdrawn in line 54 and passed to the cooler 104 via valve V8 to line 20. When adsorption zone 102 undergoes the cool down step, the waste gas feed stream is passed to adsorption zone 102 via line 10, valve V2, line 52 to produce the warm purge stream which is withdrawn in line 54 and passed through valve V8 and line 20 to air cooler 104 to produce the cooled purge stream in line 22. The cooled purge stream is passed to the first adsorption zone 101 via line 22, line 24, and valve V5. During the regeneration step, a portion of the cooled regeneration stream in line 22 may be withdrawn for use as a fuel gas stream via line 22, line 28, valve V18 and line 30, or if required to maintain the pressure in the refrigeration and heating section, between valve V16 and valve V14, a portion of the regeneration gas can be passed to fuel or to a flare (not shown) via line 28, valve V18 and line 30.

The invention will be more fully understood by reference to the following examples, and comparative data which demonstrate the effectiveness of the process.

EXAMPLES

Example I

The process of the present invention is illustrated for the scheme shown in the drawing. A waste gas feed stream is passed to the process at a rate of about 6150 Nm$^3$/hr (5.5 million standard cubic feet per day), a temperature of about 37° C. (100° F.), and a pressure of about 207 kPa (30 psia). The waste gas feed stream is saturated with water and comprises about 2000 ppm-volume aromatic hydrocarbons. A high-pressure gas stream available at a pressure of about 550 kPa (80 psia) and comprising methane is employed as the regeneration gas. Two adsorption vessels, each containing approximately 2680 kg (5000 pounds) of a high silica zeolite molecular sieve adsorbent operate according to the invention, alternately processing the waste gas feed stream and aligning themselves in the lead/trim configuration such that the waste feed gas enters the newly regenerated bed during the cool down step and the warm effluent is cooled and then passed to the adsorption zone which is still operating in the adsorption mode during the cool down phase of the process to prevent a slug of aromatic hydrocarbons from entering the treated gas stream. The air cooler reduces the temperature of the spent regeneration effluent from the regeneration step to a temperature of about 49° C. (120° F.) and the refrigeration zone reduces the temperature of the cooled effluent stream to about 4.5° C. (40° F.). The heater operates at a temperature of about 260° C. (500° F.). The treated gas stream withdrawn from the process comprises less than about 250 ppm-volume aromatic hydrocarbons.

Example II

Breakthrough curves were experimentally developed for a high silica zeolite adsorbent having a framework silica-toalumina ratio of about 35. The adsorbent was an acid washed dealuminated Y zeolite known commercially as LZ-15 as described herein above. Breakthrough curves were determined by passing an air stream at a rate of about 0.9 Nm3/hr (35 standard cubic feet per hour) through an adsorber column with a 16 mm outside diameter by about 0.45 m in length (approximately ⅝ in. outside diameter by 18 inches in length), and containing about 20 grams of adsorbent. Tests were conducted at the pressure of approximately 124 kPa (18 psia) and a temperature of about 21° C. Air streams adjusted to have a relative humidity of about 60 and about 80 percent were separately blended with a dry air stream which has been passed through a vessel containing aromatic hydrocarbons through a conventional bubbler to thereby add aromatic hydrocarbon to the humid air streams. The feed and effluent concentrations were monitored and analyzed until the outlet concentration reached at least 50 percent of the inlet concentration. Between analyses, the adsorber column was regenerated with dry air for a period of about one-hour and temperature between about 175° to about 200° C. (350° and about 400° F.). The adsorber was permitted to cool to ambient temperature in preparation for the next adsorption trial. Periodic measurements were taken of the effluent concentration during the adsorption step to establish a breakthrough curve of effluent concentration as a function of adsorption time. The actual loadings in terms of grams of aromatic hydrocarbon adsorbed per 100 grams of adsorbent were calculated based on this breakthrough curve using the feed concentration, the feed flow rate, and the adsorbent weight. The concentration of the aromatic hydrocarbon was measured on a Perkin-Elmer 3920B Gas Chromatograph using a Flame Ionization Detector. The relative humidity was measured with a Panametric 1000 relative humidity detector and calibrated with a Nesbitt gravimetric analyzer. FIG. 2 shows that the adsorbent loading for toluene over a range of toluene concentration from about 100 to about 800 ppm-vol toluene in air of 60 and 80 percent relative humidity is increasing in an essentially linear manner. FIG. 3 shows a similar linear adsorbent loading in air having relative humidity of 60 and of 80 percent for p-xylene concentrations ranging from about 40 to about 120 ppm-vol p-xylene in the humid air stream.

Example III

Breakthrough determinations for adsorbing an aromatic hydrocarbon, toluene, and carbon dioxide (99.9% carbon dioxide) in the presence of water over a high silica zeolite adsorbent were developed. The apparatus and adsorbent of Example II were employed with the substitution of carbon dioxide for the air stream of Example II. Analyses were carried out for carbon dioxide temperatures of from about 21° to 35° C. and relative humidities ranging from about 28 to about 80%. A slip stream of dry carbon dioxide was bubbled through a chamber containing toluene and then blended with the main stream of carbon dioxide that had been passed through a chamber containing water to produce the acid gas streams of carbon dioxide containing water and aromatic hydrocarbons. The feed and effluent concentrations of toluene and water were measured until the outlet conditions reached at least 50% of the inlet concentration. The adsorbent loading for toluene ranged from about 430 to about 560 ppm-vol and the water content ranged from about 28% relative humidity at about 35° C. to about 80% relative humidity at about 21° C. The results of the breakthrough toluene loadings are shown in the following Table:

TABLE

Toluene in Carbon Dioxide Breakthrough Determination

| Run | Cycle | Temp., ° C. | Toluene, ppm-vol | Relative Humidity, % | Adsorbent Loading at Breakthrough, wt-% |
|---|---|---|---|---|---|
| A | Fresh | 21 | 432 | 60 | 9.9 |
| B | Fresh | 35 | 510 | 28 | 10.5 |
| A | First | 21 | 539 | 72 | 9.6 |
| B | First | 34 | 500 | 32 | 9.9 |
| A | Second | 21 | 551 | 79 | 9.3 |
| B | Second | 34 | 481 | 38 | 9.1 |

Three adsorption/desorption cycles were performed at each temperature and the breakthrough was determined based on the effluent toluene composition reaching about 2% of the inlet toluene composition. Surprisingly, the relative humidity had little influence on the capacity of the adsorbent for the toluene as the cycle progressed beyond the first cycle.

What is claimed is:

1. A process for the rejection of trace amounts of aromatic hydrocarbons from an acid waste gas feed stream comprising hydrogen sulfide, carbon dioxide, water, and said aromatic hydrocarbons, said process comprising passing the acid waste gas feed stream comprising a substantial amount of acid gas at effective adsorption conditions through a high silica zeolite adsorbent effective for the adsorption of said aromatic hydrocarbons and water to provide a treated effluent stream essentially free of said aromatic hydrocarbons.

2. The process of claim 1 wherein the treated effluent stream, being essentially free of aromatic hydrocarbons, comprises less than about 500 ppm-vol aromatic hydrocarbons.

3. The process of claim 1 wherein said high silica adsorbent comprises a framework silica-to-alumina ratio greater than about 15 and a pore opening greater than about 6.2 angstroms.

4. The process of claim 3 wherein said high silica zeolite adsorbent comprises a zeolite molecular sieve having a FAU structure.

5. The process of claim 1 wherein the acid waste gas feed stream comprises aromatic hydrocarbons in an amount ranging from about 1 to about 5000 ppm-vol.

6. The process of claim 1 wherein the treated effluent stream, being essentially free of aromatic hydrocarbons comprises less than about 250 ppm-vol aromatic hydrocarbons.

7. The process of claim 1 wherein the adsorption conditions include an adsorption pressure ranging from about 167 to about 310 kPa (about 25 to about 45 psia).

8. The process of claim 1 wherein the acid gas comprises carbon dioxide and hydrogen sulfide.

9. The process of claim 1 wherein the acid gas comprises from about 0.5 to about 95 mol-% hydrogen sulfide and from about 10 to about 95 mol-% carbon dioxide.

10. The process of claim 1 wherein the substantial amount of acid gas comprises more than 60 mol-% of the acid waste gas stream.

11. The process of claim 1 wherein the substantial amount of acid gas comprises more than 80 mol-% of the acid waste gas stream.

12. The process of claim 1 wherein the substantial amount of acid gas comprises more than 90 mol-% of the acid waste gas stream.

13. The process of claim 1 wherein said high silica zeolite is selected from the group consisting of clinoptilolite, silicalite, zeolite Beta, boggsite, faujasite, EMC-2, zeolite L, mordenite, offretite, ferrierite, LZ-10, LZ-20, and LZ-15, ZSM-5, ZSM-11, ZSM-18, ZSM-57, EU-1, and mixtures thereof.

14. The process of claim 1 further comprising passing the treated effluent stream to a sulfur recovery process comprising a hydrogen sulfide oxidation process selected from the group consisting of a thermal combustion step, a gas phase catalytic oxidation step, an aqueous alkaline washing step, an aqueous bacterial sulfide-oxidizing step, and combinations thereof.

15. The process of claim 1 wherein the acid waste gas feed stream is an effluent from an amine treating zone.

* * * * *